United States Patent
Sato et al.

(10) Patent No.: US 6,667,854 B2
(45) Date of Patent: Dec. 23, 2003

(54) MAGNETIC HEAD HAVING HEAD ELEMENT PROTECTED FROM ELECTROSTATIC DAMAGE, AND PRODUCTION METHOD THEREFOR

(75) Inventors: Toshihiko Sato, Niigata-ken (JP); Sadao Kawata, Niigata-ken (JP); Masaharu Yokoyama, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/369,152

(22) Filed: Feb. 18, 2003

(65) Prior Publication Data

US 2003/0123190 A1 Jul. 3, 2003

Related U.S. Application Data

(62) Division of application No. 09/662,309, filed on Sep. 15, 2000.

(30) Foreign Application Priority Data

Sep. 16, 2000 (JP) .......................... 11-262022

(51) Int. Cl.[7] .................................. G11B 5/60
(52) U.S. Cl. ................ 360/234.5; 360/236.4; 360/236.5
(58) Field of Search ............... 360/234.5, 235.6, 360/236.4, 235.7, 236.5

(56) References Cited

U.S. PATENT DOCUMENTS

| | | | | | |
|---|---|---|---|---|---|
| 4,317,149 A | * | 2/1982 | Elser et al. | ................. | 360/126 |
| 4,759,118 A | | 7/1988 | Nakashima | | |
| 4,996,614 A | * | 2/1991 | Okutsu | .................... | 360/236.4 |
| 5,095,613 A | | 3/1992 | Hussinger et al. | | |
| 5,293,288 A | * | 3/1994 | Ishikawa et al. | ......... | 360/234.5 |
| 5,663,853 A | * | 9/1997 | Park | ...................... | 360/236.4 |
| 5,781,377 A | * | 7/1998 | Koka et al. | ............. | 360/235.1 |
| 5,799,388 A | | 9/1998 | Shouji | | |
| 5,994,035 A | | 11/1999 | Tsukamoto et al. | | |
| 6,084,743 A | | 7/2000 | Comstock et al. | | |
| 6,122,148 A | | 9/2000 | Hamaguchi et al. | | |
| 6,324,031 B1 | | 11/2001 | Comstock et al. | | |
| 6,373,659 B1 | | 4/2002 | Hamaguchi et al. | | |
| 2002/0057531 A1 | * | 5/2002 | Segar et al. | ............. | 360/234.5 |

FOREIGN PATENT DOCUMENTS

| | | | | |
|---|---|---|---|---|
| JP | 361 206 917 | | 9/1986 | |
| JP | 61260482 A | * | 11/1986 | ............ G11B/21/24 |
| JP | 62012917 A | * | 1/1987 | ............ G11B/5/60 |
| JP | 02156491 A | * | 6/1990 | ............ G11B/21/21 |
| JP | 02260106 A | * | 10/1990 | ............ G11B/5/31 |
| JP | 03152778 A | * | 6/1991 | ............ G11B/21/21 |
| JP | 03181080 A | * | 8/1991 | ............ G11B/21/21 |
| JP | 403 214 478 | | 9/1991 | |
| JP | 407 302 420 | | 11/1995 | |
| JP | 8-138223 | | 5/1996 | |
| JP | 409 091 644 | | 4/1997 | |
| JP | 09 128 711 | | 5/1997 | |
| JP | 09128711 A | * | 5/1997 | ............ G11B/5/31 |
| JP | 2000251217 A | * | 9/2000 | ............ G11B/5/17 |
| WO | WO 9601470 A1 | * | 1/1996 | ............ G11B/5/60 |

\* cited by examiner

*Primary Examiner*—William Klimowicz
(74) *Attorney, Agent, or Firm*—Brinks Hofer Gilson & Lione (57) ABSTRACT

In a magnetic head, a head element and bumps connected thereto are formed on one end face of a slider substrate, and an insulating film is formed on the other end face opposite from the one end face. Therefore, even when the slider is electrically charged, the other end face thereof does not contact bumps formed in another slider substrate, and charges of the slider substrate will not move into the bumps. This prevents the slider substrate from electrostatic damage.

2 Claims, 12 Drawing Sheets

MAGNETIC HEAD HAVING HEAD ELEMENT PROTECTED FROM ELECTROSTATIC DAMAGE, AND PRODUCTION METHOD THEREFOR

This application is a division of application Ser. No. 09/662,309, filed Sep. 15, 2000, (pending) which is hereby incorporated by reference herein.

BACKGROUND OF THE INVENTION

1. Field of the Invention

The present invention relates to a magnetic head to be mounted in a hard magnetic disk device and the like, and to a production method therefor.

2. Description of the Related Art

Figure 19:
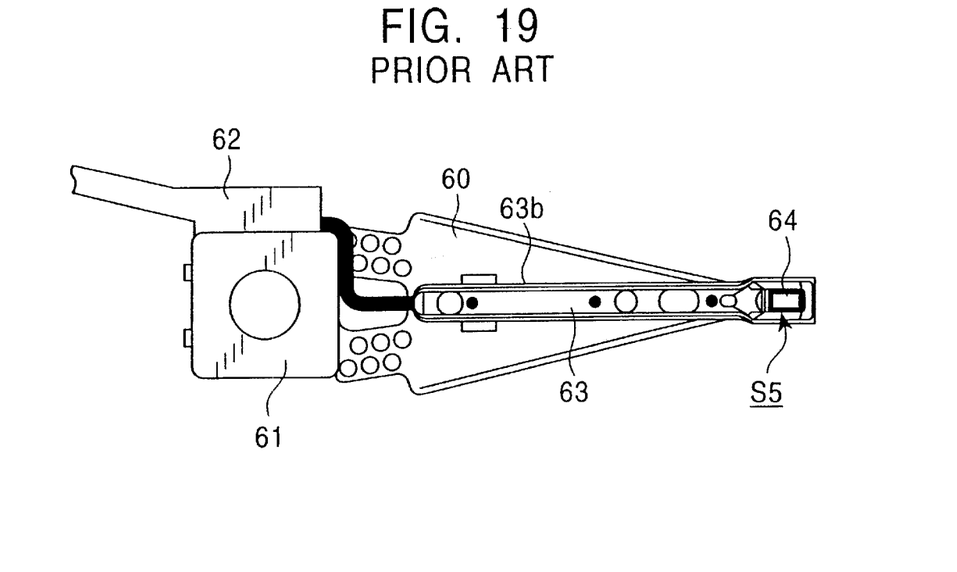
FIG. 19 is a general view of a conventional magnetic head.
Figure 20:
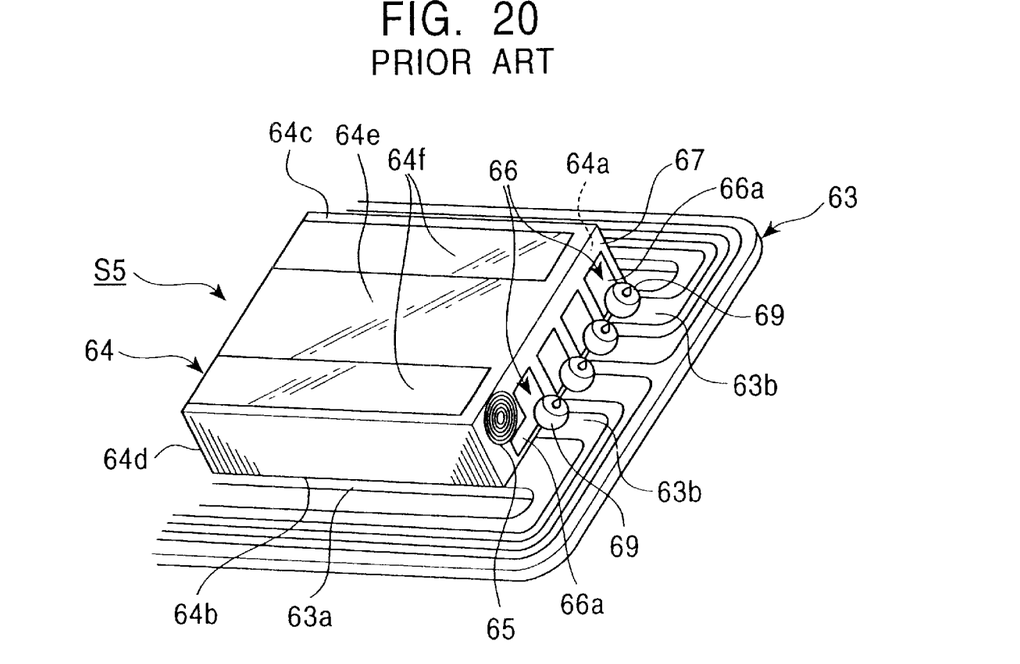
FIG. 20 is an enlarged perspective view showing the principal part of the conventional magnetic head.

In a conventional magnetic head to be mounted in a hard magnetic disk device and the like, as shown in FIGS. 19 and 20, a load beam 60 made of a stainless steel plate is provided with a mounting section 61, a flexible printed circuit board 62, and a flexure 63 made of a stainless steel thin plate. On the surface of the flexure 63, a conductive pattern 63b is formed via a resin layer of polyimide or the like and is electrically connected to a wiring section of the flexible printed circuit board 62.

The leading end of the flexure 63 is partly cut out to form a tongue portion 63a which has a slider S5 fixed thereon.

The slider S5 comprises a nearly rectangular slider substrate 64 made of a ceramic material, such as $Al_2O_3$—TiC, a head element 65 formed on one end face 64a of the slider substrate 64, bumps 66 made of a good conductive material, such as Ni, so as to be electrically connected to the head element 65, and a protective film 67 made of an insulating material, such as alumina, so as to cover the head element 65. Exposed portions 66a of the bumps 66 exposed from the protective film 67 are flush with or protrude from the surface of the protective film 67.

The other end face 64d of the slider substrate 64 on the opposite side from the one end face 64a is a planar surface in parallel with the one end face 64a. On an upper surface 64c of the slider substrate 64 orthogonal to the one end face 64a, a silicon film and a carbon film are stacked in order, and an air groove 64e and rail portions 64f on both sides of the air groove 64e are formed, thereby forming a magnetic disk opposing surface of the slider S5.

A bottom surface 64b of the slider substrate 64 of the slider S5 on the opposite side from the upper surface 64c is fixedly bonded to the flexure 64. At the corners formed between the end face 64a of the slider S5 and the flexure 63, nearly spherical balls 69 made of metal, such as Au, are bonded to both the exposed portions 66a of the bumps 66 and the leading end of the conductive pattern 63b, whereby the bumps 66 and the conductive pattern 63b are electrically connected via the balls 69.

Figure 21:
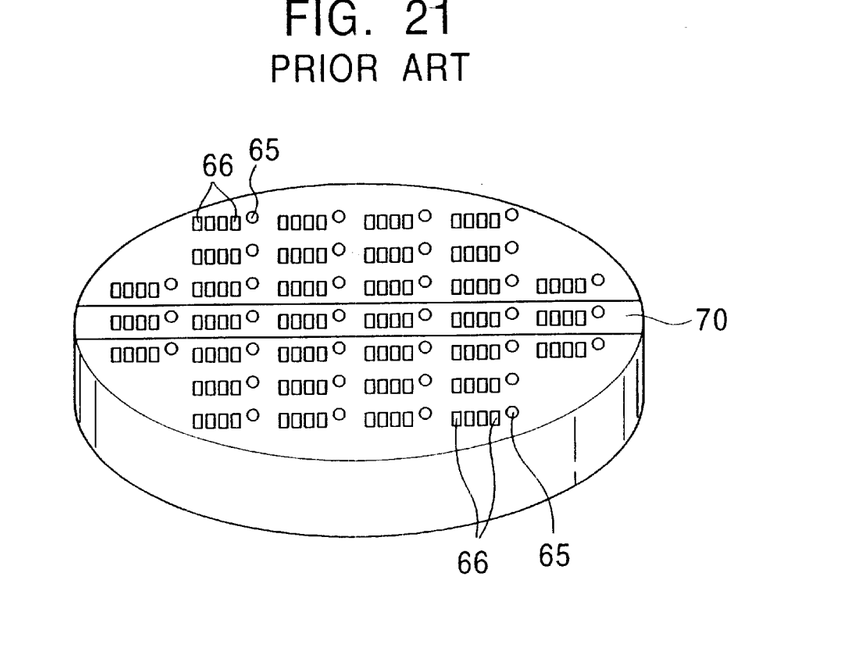
FIG. 21 is an explanatory view illustrating a production method for the conventional magnetic head.

A method for producing the slider S5 of the conventional magnetic head will now be described. Referring to FIG. 21, a plurality of head elements 65 and bumps 66 respectively connected thereto are arranged on the surface of a wafer 70 made of a ceramic material, such as $Al_2O_3$—TiC, so as to serve as a base material of slider substrates 64. Subsequently, a protective film 67 is formed on the surface of the wafer 70 so as to cover the head elements 65 and the bumps 66, and the surface of the protective film 67 is lapped so as to expose exposed portions 66a of the bumps 66 from the protective film 67.

Figure 22:
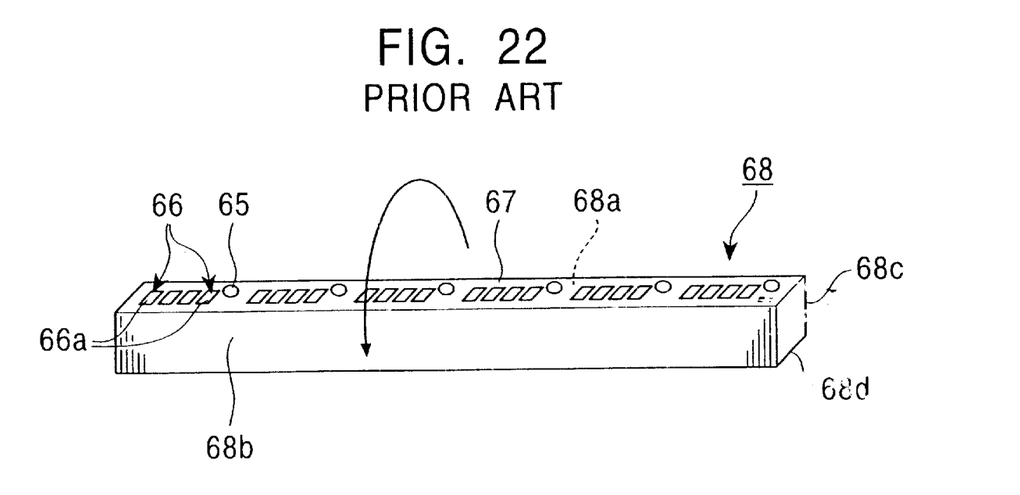
FIG. 22 is an explanatory view illustrating the production method.

Then, as shown in FIG. 22, the wafer 70 is cut into slider bars 68 so that the cutting surfaces serve as upper surfaces 64c and bottom surfaces 64b of slider substrates 64. A plurality of head elements 65 and bumps 66 are arranged on one side face 68a of each slider bar 68. The other side face 68d of the slider bar 68 on the opposite side from the one side face 68a is a planar surface in parallel therewith.

Figure 23:
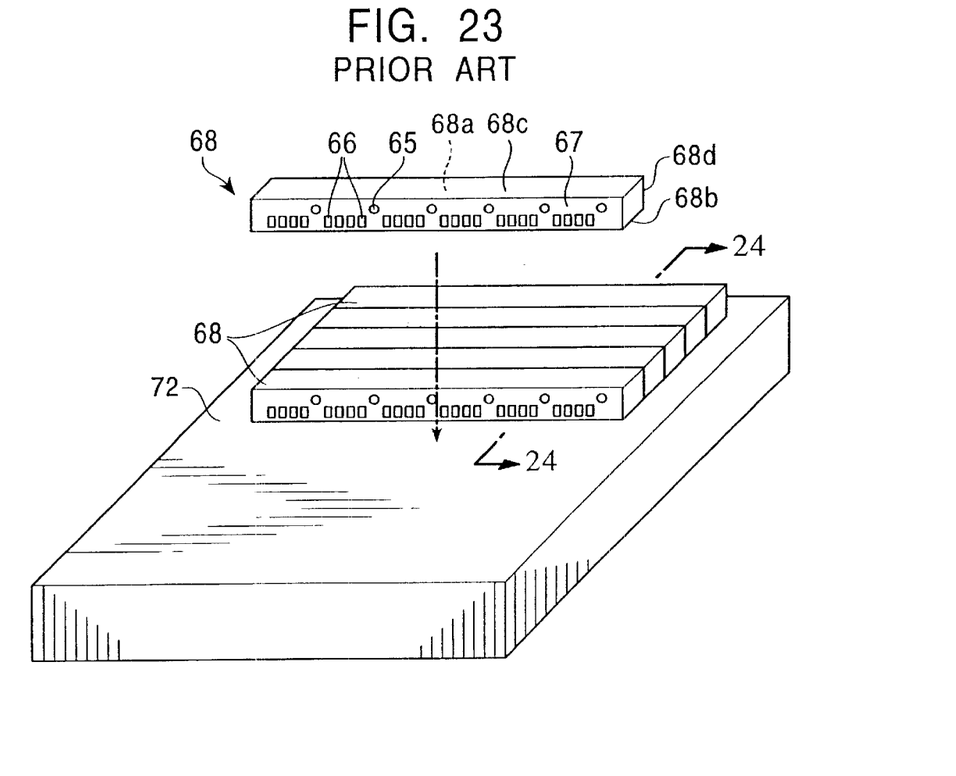
FIG. 23 is an explanatory view illustrating the production method.
Figure 24:
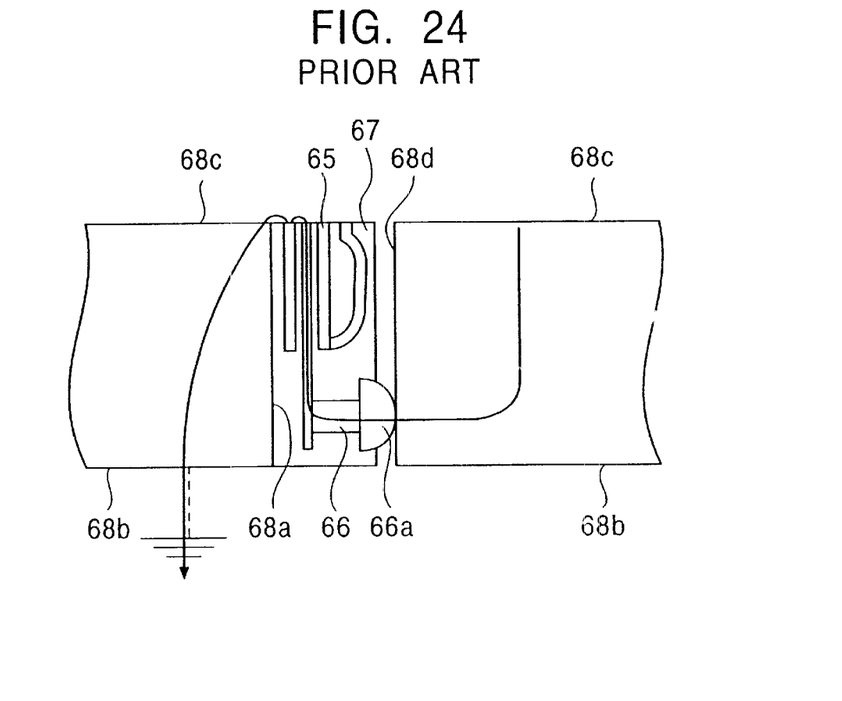
FIG. 24 is an explanatory view illustrating the production method.

As shown in FIG. 23, a plurality of slider bars 68 are placed on a jig 72 so that one side faces 68a are oriented in the same direction and so that bottom surfaces 68b, serving as the bottom surfaces 64b of the slider substrates 64, are fixedly bonded to the jig 72. In this case, as shown in FIG. 24, the exposed portion 66a of the bump 66 in each slider bar 68 is in contact with the other side face 68d of the adjoining slider bar 68.

Subsequently, a silicon film and a carbon film are deposited and stacked in order on upper surfaces 68c of the slider bars 68, serving as the upper surfaces 64c of the slider substrates 64, by ECR-CVD.

A resist film (not shown) is formed on the upper surfaces 68c of the slider bars 68 and is patterned by photolithography so as to conform to the shape of a magnetic disk opposing surface of the slider S5.

In a dry etching process, portions of the upper surfaces 68c of the slider bars 68 exposed from the resist film are removed by irradiation with ions or electrons, thereby forming magnetic disk opposing surfaces of the sliders S5.

Then, the resist film is stripped off the upper surfaces 68c of the slider bars 68, and the slider bars 68 are separated from the jig 72 and each are divided into sliders S5. The production of sliders S5 is thereby completed.

In the conventional magnetic head and the production method therefor described above, the exposed portions 66a of the bumps 66 exposed from the protective film 67 of the slider S5 are in contact with the other end face 64d of the slider substrate 64 made of $Al_2O_3$—TiC in another slider S5 in the production procedure.

In such a condition, the slider substrate 64 is electrically charged due to irradiation with ions or electrons in a film deposition process for forming a silicon film and a carbon film by ECR-CVD and a dry etching process utilizing ion milling or the like. Since the slider substrate 64 made of $Al_2O_3$—TiC or the like is conductive, charges move from the slider substrate 64 into the bumps 66 in contact with the other end face 64d of another slider substrate 64, as shown in FIG. 24, whereby the head element 65 is electrostatically damaged.

SUMMARY OF THE INVENTION

Accordingly, an object of the present invention is to provide a magnetic head in which a head element is not electrostatically damaged even during a film deposition process using ECR-CVD and a dry etching process, and to provide a production method for the magnetic head.

In order to achieve the above object, according to a first aspect of the present invention, there is provided a magnetic head having a slider, wherein the slider includes a slider substrate, at least one of head element formed on one end face of the slider substrate, a protective film for covering the head element, and a plural bump electrically connected to the head element and having an exposed portion exposed from the protective film, and wherein the other end face of the slider substrate on the opposite side from the one end face with the head element is provided with an insulating-film.

In such a configuration of the magnetic head, the other end face of the charged slider substrate does not contact a bump formed of another slider substrate during the production procedure. Consequently, charges of the charged slider substrate will not move into the bump, and this can prevent electrostatic damage of the head element.

Preferably, the insulating film covers the entirety of the other end face of the slider substrate. This makes it possible to more reliably insulate the charged slider substrate from a bump of another slider substrate.

Preferably, the exposed portion of the bump is flush with or protrudes from the surface of the protective film. This makes it possible to select ball bonding or wire bonding in order to electrically connect the bump and a conductive pattern electrically connected to the outside.

According to a second aspect of the present invention, there is provided a magnetic head having a slider, wherein the slider includes a slider substrate, at least one of head element formed on one end face of the slider substrate, a protective film for covering the head element, and a plural bump electrically connected to the head element and having an exposed portion exposed from the protective film, and wherein the other end face of the slider substrate on the opposite side from the one end face with the head element has a projecting portion, and the distance from the surface of the protective film to the projecting portion formed on the other end face is longer than the distance from the exposed portion of the bump to the other end face.

In such a configuration of the magnetic head, the other end face of the charged slider substrate contacts the protective film formed on one end face of another slider substrate at its projecting portion, but does not contact the bump during the production procedure. Since charges of the charged slider substrate do not move into the bump, electrostatic damage of the head element can be prevented.

Preferably, the projecting portion is formed of an inclined face formed on the other end face. This makes it possible to more easily form the projecting portion by machining.

Preferably, the slider has a magnetic disk opposing surface opposing a magnetic disk, and the inclined portion has the top on the side of the magnetic disk opposing surface.

In such a configuration of the magnetic head, the projecting portion on the other end face of the slider substrate is in contact with the protective film formed on one end face of another slider substrate on the side of the magnetic disk opposing surface so as to close the side of the magnetic disk opposing surface. Therefore, foreign materials do not adhere to one end face and the other end face of the slider when working the magnetic disk opposing surface. This can prevent the magnetic disk from being damaged by foreign materials when the magnetic head is mounted in the hard magnetic disk device.

Preferably, the projecting portion is formed of a rib projecting from the other end face. This makes it possible to more easily form the projecting portion by machining.

Preferably, the slider has a magnetic disk opposing surface opposing a magnetic disk, and the rib is flush with the magnetic disk opposing surface.

In such a configuration of the magnetic head, the projecting portion on the other end face of the slider substrate is in contact with the protective film formed on one end face of another slider substrate on the side of the magnetic disk opposing surface so as to close the side of the magnetic disk opposing surface. Therefore, foreign materials do not adhere to one end face and the other end face of the slider when working the magnetic disk opposing surface. This can prevent the magnetic disk from being damaged by foreign materials when the magnetic head is mounted in the hard magnetic disk device.

Preferably, the exposed portion of the bump is flush with or protrudes from the surface of the protective film.

This makes it possible to select ball bonding or wire bonding in order to electrically connect the bump and a conductive pattern electrically connected to the outside.

According to a third aspect of the present invention, there is provided a magnetic head having a slider, wherein the slider includes a slider substrate, at least one of head element formed on one end face of the slider substrate, a protective film for covering the head element, and a plural bump electrically connected to the head element and having an exposed portion exposed from the protective film, and wherein the surface of the exposed portion of the bump is recessed from the surface of the protective film.

In such a configuration of the magnetic head, the other end face of the charged slider substrate contacts the protective film formed on one end face of another slider substrate, but does not contact the bump during the production procedure. Since charges of the charged slider substrate will not move into the bump, electrostatic damage of the head element can be prevented.

According to a fourth aspect of the present invention, there is provided a magnetic head production method including a head element forming step of forming, on a wafer, a plurality of head elements, a protective film for covering the head elements, and bumps electrically connected to the respective head elements, an insulating film forming step of forming an insulating film on the surface of the wafer opposite from the surface with the head elements, a slider bar forming step of cutting the wafer into a plurality of slider bars each having one side face with a plurality of head elements and the other side face with the insulating film, an arranging step of arranging the slider bar, formed in the slider bar forming step, in the same orientation so that a side face of one of adjoining slider bars having the insulating film is in contact with the bump or a side face of the protective film of the other slider bar, and a working step of forming magnetic disk opposing surfaces in the slider bars arranged in the arranging step by working so as to oppose a magnetic disk.

In such a magnetic head production method, since the insulating film is formed on the other side face of the slider bar, the bump formed on one side face of another slider bar does not contact the other side face of the charged slider bar in the working step. Therefore, charges of the charged slider bar will not move into the bump, and the head element is prevented from being electrostatically damaged.

According to a fifth aspect of the present invention, there is provided a magnetic head production method including a head element forming step of forming, on a wafer, a plurality of head elements, a protective film for covering the head elements, and bumps electrically connected to the respective head elements, a slider bar forming step of cutting the wafer with the head elements into a plurality of slider bars, a grinding step of grinding the other side faces of the slider bars on the opposite sides from the side faces with the head elements so as to form projecting portions, an arranging step of arranging the slider bars with the projecting portion in the same orientation so that the projecting portion of one of adjoining slider bars is in contact with the protective film for covering the head elements in the other slider bar and so that a space is formed between the exposed portion of the bump and the other side face, and a working step of forming magnetic disk opposing surfaces in the slider bars arranged in the arranging step by working so as to oppose a magnetic disk.

In such a magnetic head production method, since a space is formed between the other side face of the slider bar and the exposed portion of the bump formed on one side face of the adjoining slider bar, charges of the charged slider bar will not move into the bump, and the head element is prevented from being electrostatically damaged.

Preferably, in the arranging step, the projecting portion of one of the slider bars is in contact with a portion of the protective film for covering the head elements of the other slider bar excluding an exposed portion from which the bumps are exposed.

Preferably, in the grinding step, the projecting portion is formed of an inclined portion. This makes it possible to easily form the projecting portion.

Preferably, in the grinding step, the projecting portion is formed of a rib. This makes it possible to easily form the projecting portion.

According to a sixth aspect of the present invention, there is provided a magnetic head production method including a head element forming step of forming, on a wafer, a plurality of head elements, bumps electrically connected to the respective head elements, and a protective film for covering the head elements and the bumps, a photolithographic etching step of exposing exposed portions of the bumps from the protective film by forming a window in a position of the protective film formed in the head element forming step corresponding to the bumps, a slider bar forming step of cutting the wafer with the head elements into a plurality of slider bars, an arranging step of arranging the slider bars formed in the slider bar forming step in the same orientation so that the exposed portion of the bump of one of adjoining slider bars is in contact with the side face of the other slider bar with the head element formed thereon, and a working step of forming magnetic disk opposing surfaces in the slider bars arranged in the arranging step by working so as to oppose a magnetic disk.

In such a magnetic head production method, since a space is formed between the other side face of the slider bar and the exposed portion of the bump formed on one side face of the adjoining slider bar, charges of the charged slider bar will not move into the bump, and the head element is prevented from being electrostatically damaged.

Further objects, features, and advantages of the present invention will become apparent from the following description of the preferred embodiments with reference to the attached drawings.

DESCRIPTION OF THE PREFERRED EMBODIMENTS

A magnetic head and a production method therefor according to the present invention will be described below with reference to FIGS. 1 to 18.

Figure 1:
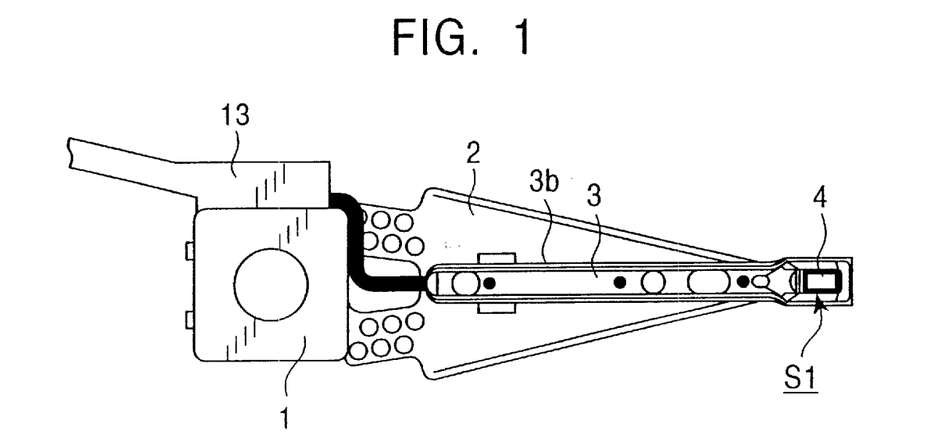
FIG. 1 is a general view of a magnetic head according to a first embodiment of the present invention.

First, a magnetic head according to a first embodiment of the present invention will be described. Referring to FIG. 1, in a magnetic head to be mounted on a hard magnetic disk device or the like, a load beam 2 formed of a stainless steel plate is provided with a mounting section 1, a flexible printed circuit board 13, and a flexure 3 formed of a stainless steel thin plate. On the surface of the flexure 3, a conductive pattern 3b is formed via a resin layer made of polyimide or the like and is electrically connected to a wiring section of the flexible printed circuit board 13.

Figure 2:
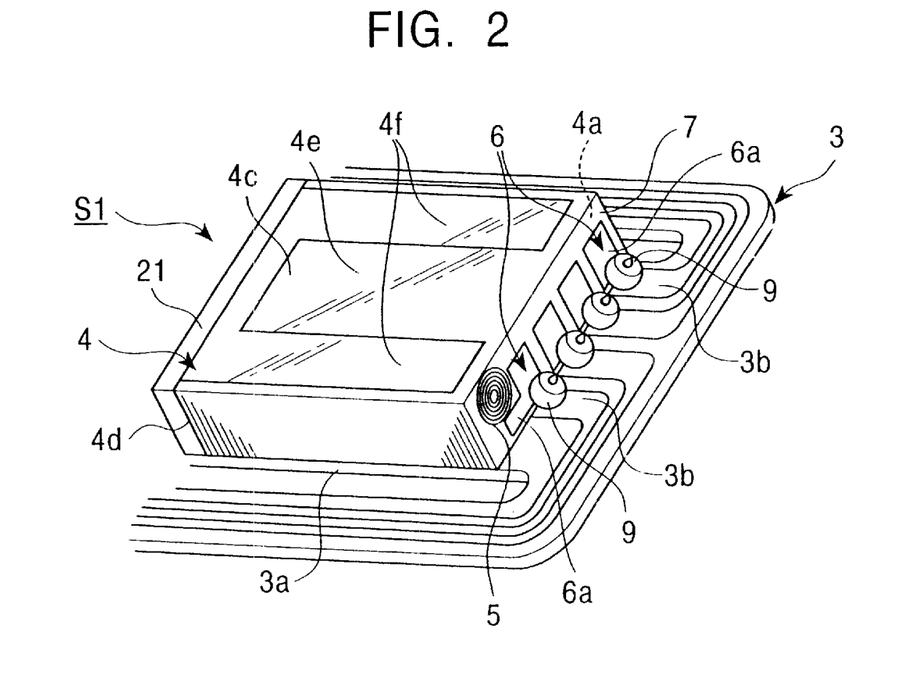
FIG. 2 is an enlarged perspective view showing the principal part of the magnetic head.

As shown in FIG. 2, the leading end of the flexure 3 is partly cut out so as to form a tongue portion 3a having a slider S1 fixed thereon. The slider S1 comprises a nearly rectangular slider substrate 4 made of a ceramic material, such as $Al_2O_3$—TiC, a head element 5 formed on one end face 4a of the slider substrate 4, four (two for recording and the others for playback) bumps 6 made of a good conductive material, such as Ni, so as to be electrically connected to the head element 5, and a protective film 7 made of an insulating material, such as alumina, so as to cover the head element 5. Exposed portions 6a of the bumps 6 exposed from the protective film 7 are flush with or protrude from the surface of the protective film 7.

The other end face 4d of the slider substrate 4 on the opposite side from the one end face 4a is a planar surface in parallel therewith. On the entire surface thereof, an insulating film (a high-resistance material with a surface resistance of $10^6$ Ω/sq. or more) 21 is formed, which is made of alumina, $SiO_2$, or the like and is 0.3 μm to 1.0 μm in thickness.

On an upper surface 4c of the slider substrate 4 orthogonal to the end face 4a so as to form a magnetic disk opposing surface of the slider S1, a silicon film (5 Å) and a carbon film (45 Å) are stacked in order, and an air groove 4e and rail portions 4f on both sides thereof are formed so as to obtain an air flow that allows the slider S1 to fly above a magnetic disk when a magnetic disk device is driven.

At the corners formed between the one end face 4a of the slider S1 and the flexure 3, nearly spherical balls 9 made of metal, such as Au, are connected to both the exposed portions 6a of the bumps 6 and the leading end of the conductive pattern 3, whereby the bumps 6 and the conductive pattern 3b are electrically connected via the balls 9. That is, the bumps 6 are electrically connected to the wiring section of the flexible printed circuit board 13 via the conductive pattern 3b and the balls 9.

While the wiring section of the flexible printed circuit board 13 and the bumps 6 are electrically connected via the conductive pattern 3b and the balls 9 in the above embodiment, wires electrically connected to the wiring section of the flexible printed circuit board 13 may be bonded to the exposed portions 6a of the bumps 6.

The magnetic head having such a slider S1 is mounted on the hard magnetic disk device so that the magnetic disk opposing surface of the slider S1 faces a magnetic recording surface of a magnetic disk. When the hard magnetic disk device is driven, the slider S1 receives an air flow, which is generated by rotation of the magnetic disk, on its magnetic disk opposing surface and thereby flies with a small space between the magnetic disk and the head element 5, and recording and playback of the magnetic disk are performed by the head element 5.

A production method for the slider S1 of the magnetic head according to the first embodiment will be described below with reference to FIGS. 3 to 6.

Figure 3:
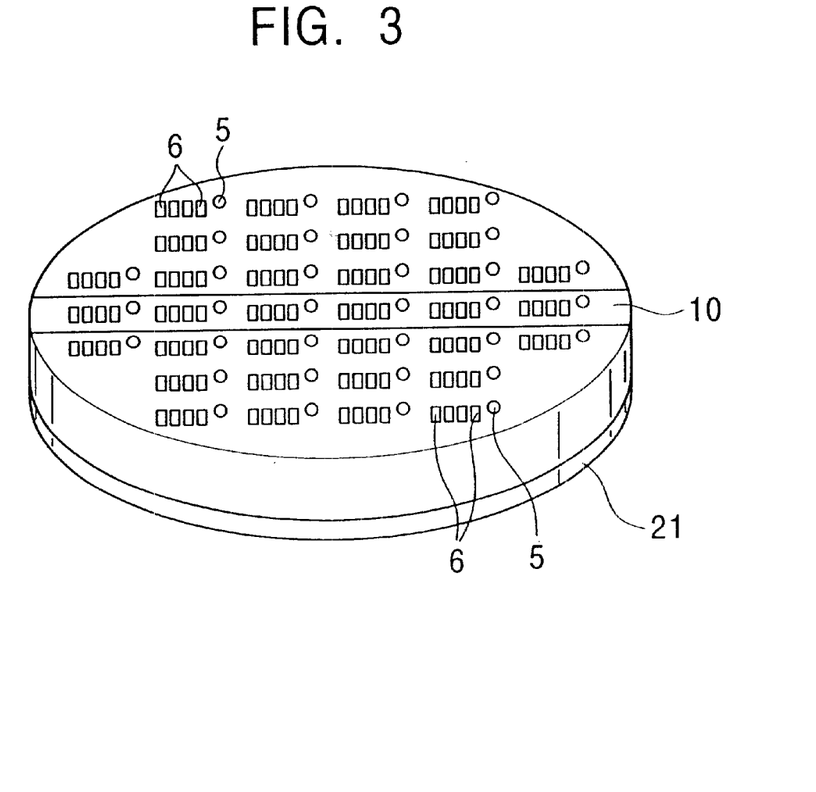
FIG. 3 is an explanatory view illustrating a production method for the magnetic head.

First, in a head forming process shown in FIG. 3, a plurality of head elements 5 and bumps 6 connected to the respective head elements 5 are arranged on the surface of a wafer 10 made of a ceramic material such as $Al_2O_3$—TiC. A protective film 7 is formed on the surface of the wafer 10 so as to cover the head elements 5 and the bumps 6, and the surface thereof is lapped so that exposed portions 6a of the bumps 6 are exposed from the protective film 7. In the next insulating film forming process, an insulating film 21 made of alumina, $SiO_2$, or the like is formed on the back side of the wafer 10.

While the head forming process is first performed in the above embodiment, either the head forming process or the insulating film forming process may be performed first.

Figure 4:
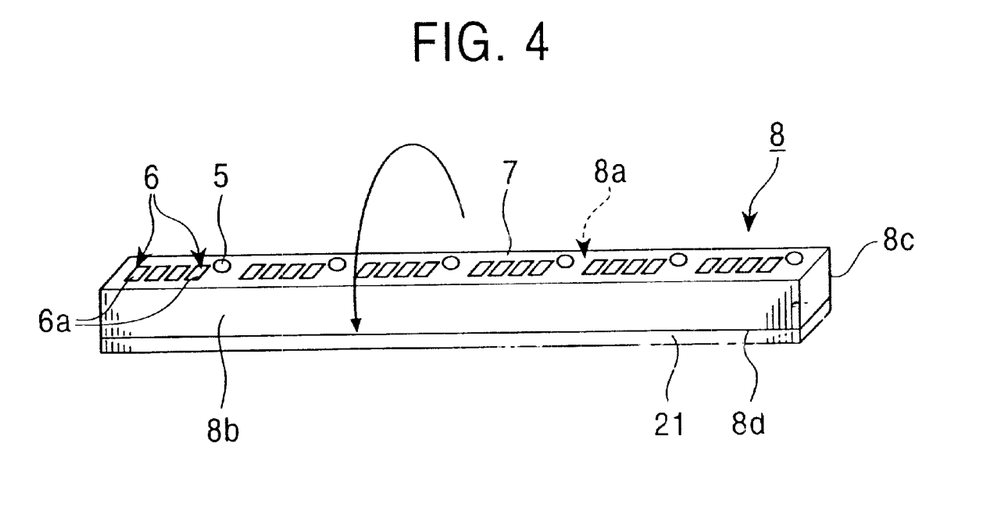
FIG. 4 is an explanatory view illustrating the production method.

In the next slider bar forming process shown in FIG. 4, the wafer 10 is cut into slider bars 8 so that the cutting surfaces serve as upper surfaces 4c and bottom surfaces 4b of slider substrates 4. A plurality of head elements 5 and bumps 6 are arranged in parallel on one side face 8a of each slider bar 8. The other side face 8d of the slider bar 8 on the opposite side from the one side face 8a is covered with the insulating film 21.

Figure 5:
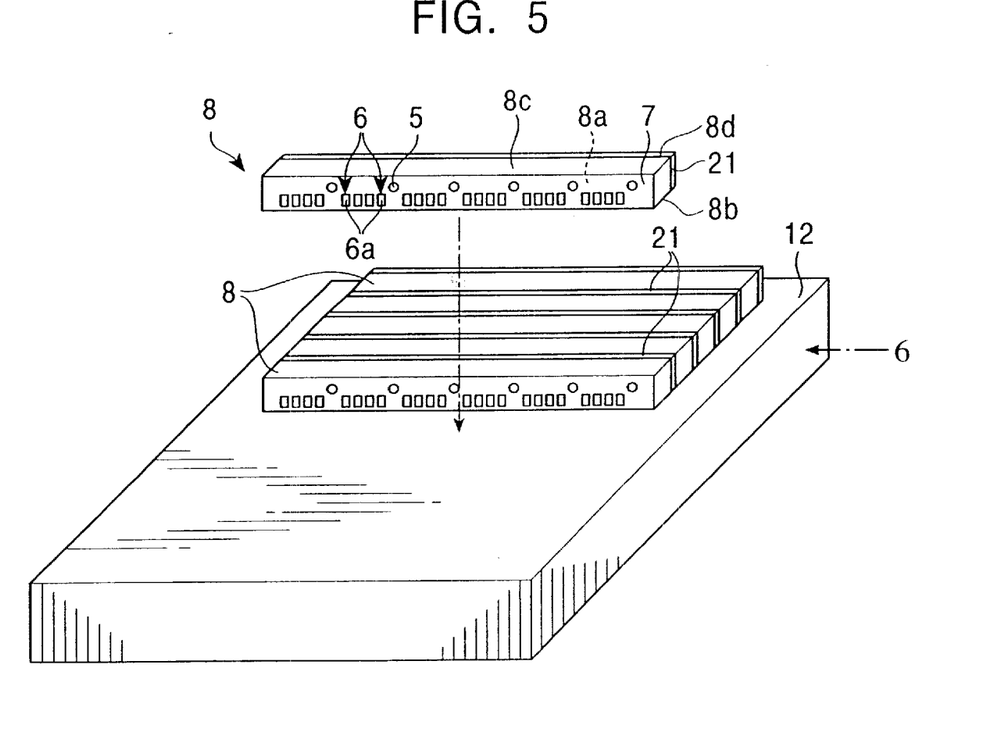
FIG. 5 is an explanatory view illustrating the production method.
Figure 6:
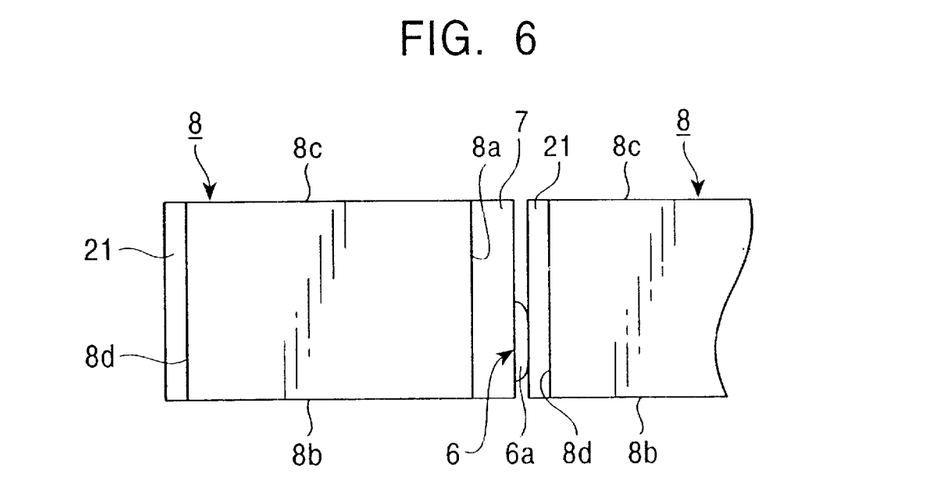
FIG. 6 is a side view of slider bars shown in FIG. 5, as viewed from the direction of arrow 6.

In an arranging process shown in FIGS. 5 and 6, a plurality of slider bars 8 are placed on a jig 12 with their side faces 8a oriented in the same direction. In this case, bottom surfaces 8b of the slider bars 8, which serve as the bottom surfaces 4b of the slider substrates 4, are fixedly bonded to the jig 12, and upper surfaces 8c thereof serve as the upper surfaces 4c of the slider substrate 4 where the magnetic disk opposing surfaces are formed.

In this case, as shown in FIG. 6, the insulating film 21 covering the other side face 8d of the slider bar 8 is contact with the exposed portion 6a of the bump 6 formed in the adjoining slider bar 8.

In a case in which the surface of the exposed portion 6a is flush with the protective film 7, the protective film 7 is in contact with the insulating film 21.

In the next film deposition process, a silicon film and a carbon film are deposited and stacked in order on the upper surfaces 8c of the slider bars 8 by ECR-CVD.

Even when the slider bar 8 is electrically charged due to irradiation with ions or electrons during this film deposition process, since it is insulated from the exposed portion 6a of the bump 6 of the adjoining slider bar 8 by the insulating film 21, charges of the slider bar 8 will not move into the bump 6 of the adjoining slider bar 8.

A resist film (not shown) is formed on the upper surfaces 8c of the slider bars 8 having the silicon film and the carbon film stacked thereon, and is patterned so as to conform to the shape of the magnetic disk opposing surface of the slider S1 by photolithography.

In a dry etching process, portions exposed from the resist film on the upper surfaces 8c of the slider bars 8 are removed by irradiation with ions or electrons, thereby forming magnetic disk opposing surfaces of the sliders S1.

Even when the slider bar 8 is electricity charged due to irradiation with ions or electrons during the dry etching process, since it is insulated from the exposed portion 6a of the bump 6 of the adjoining slider bar 8 by the insulating film 21, charges of the slider bar 8 will not move into the bump 6 of the adjoining slider bar 8.

Subsequently, the resist film is stripped off the upper surfaces 8c of the slider bars 8, and the slider bars 8 are separated from the jig 12 and are divided into sliders S1. The production of sliders S1 according to the first embodiment is thereby completed.

Figure 7:
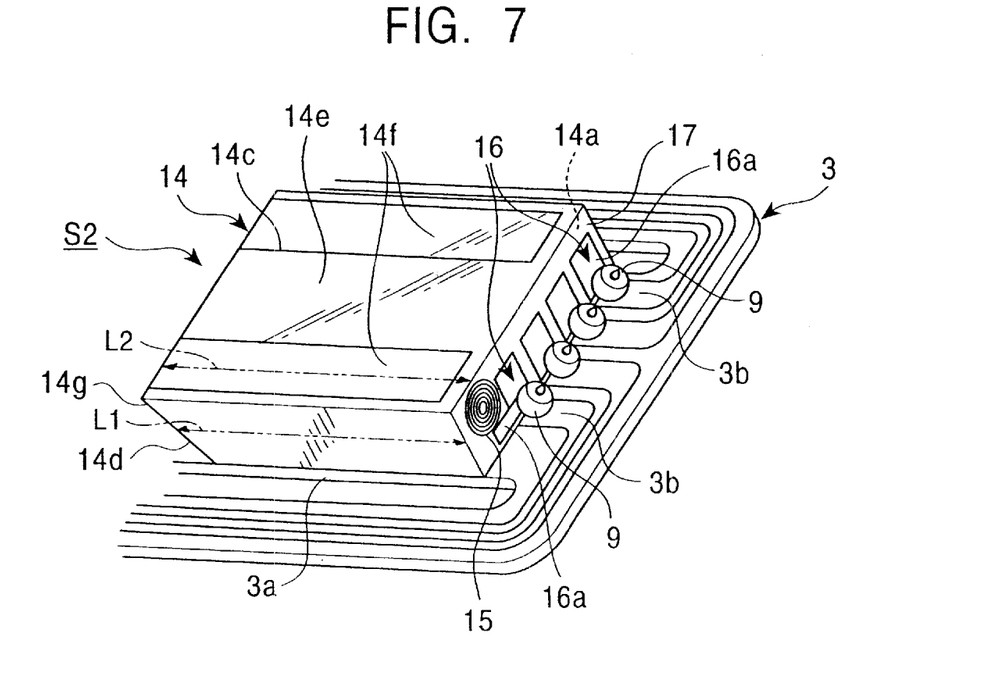
FIG. 7 is an enlarged perspective view showing the principal part of a magnetic head according to a second embodiment of the present invention.

A magnetic head and a production method therefor according to a second embodiment of the present invention will now be described with reference to FIGS. 7 to 10. Referring to FIG. 7, a slider S2 of a magnetic head according to the second embodiment is mounted on a flexure 3 in a manner similar to that of the slider S1 of the first embodiment. The slider S2 comprises a nearly rectangular slider substrate 14 made of a ceramic material, such as $Al_2O_3$—TiC, a head element 15 formed on one end face 14a of the slider substrate 14, four (two for recording and the others for playback) bumps 16 made of a good conductive material, such as Ni, so as to be electrically connected to the head element 15, and a protective film 17 made of an insulating material, such as alumina, so as to cover the head element 15. Exposed portions 16a of the bumps 16 exposed from the protective film 17 are flush with or protrude from the surface of the protective film 17.

On an upper surface 14c of the slider substrate 14 orthogonal to the one end face 14a so as to form a magnetic disk opposing surface of the slider S2, a silicon film (5 Å) and a carbon film (45 Å) are stacked in order, and an air groove 14e and rail portions 14f on both sides thereof are formed so as to obtain an air flow that allows the slider S2 to fly above a magnetic disk when a magnetic disk device is driven.

On the other end face 14d of the slider substrate 14 on the opposite side from the one end face 14a, a projecting portion 14g is formed outside portions opposite from the exposed portions 16a of the bumps 16. A distance L1 from the exposed portion 16a to a position on the other end face 14d corresponding to the exposed portion 16a is shorter than a distance L2 from a position on the surface of the protective film 17 corresponding to the projecting portion 14g to the projecting portion 14g. The projecting portion 14g is formed of an inclined portion on the other end face 14d of the slider substrate 14, and the top of the inclined portion is flush with the upper surface 14c of the slider substrate 14. That is, because of the inclined portion, the distance between the one end face 14a and the other end face 14d decreases away from the upper surface 14c.

Such a magnetic head according to the second embodiment is mounted on a hard magnetic disk device in a manner similar to that of the first embodiment.

Figure 8:
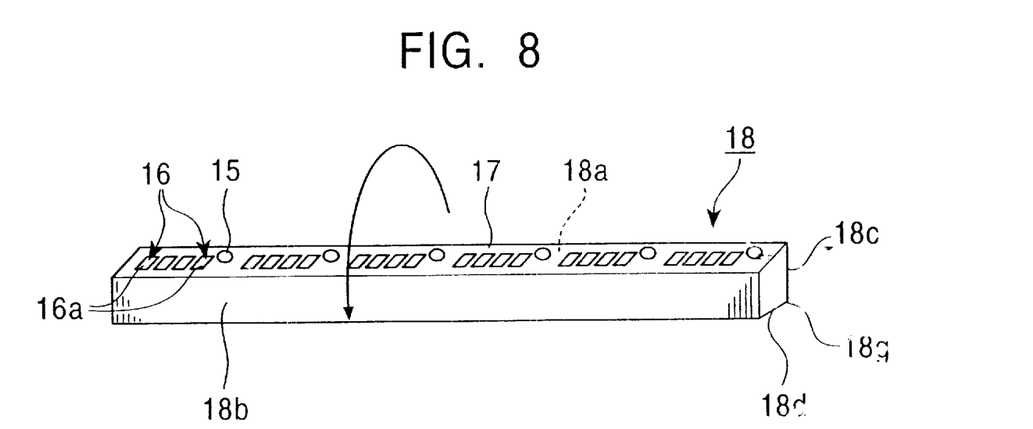
FIG. 8 is an explanatory view illustrating a production method for the magnetic head.

A production method for the slider S2 of the magnetic head of the second embodiment will now be described with reference to FIGS. 8 to 10. In a manner similar to that of the head forming process of the first embodiment shown in FIG. 3, a plurality of head elements 15 and bumps 16 are arranged on the surface of a wafer 10. In a manner similar to that of the slider bar forming process of the first embodiment, a slider bar 18 is formed so as to have head elements 15 and bumps 16 arranged in parallel, as shown in FIG. 8. In this case, one side face 18a, an upper surface 18c, the other side face 18d, and a bottom surface 18b of the slider bar 18 serve, respectively, as the one end face 14a, the upper surface 14c, the other end face 14d, and the bottom surface 14b of the slider substrate 14.

In a grinding process, the other side face 18d of the slider bar 18 is ground by machining with a grinder or the like so that it becomes an inclined portion serving as a projecting portion 18g.

Figure 9:
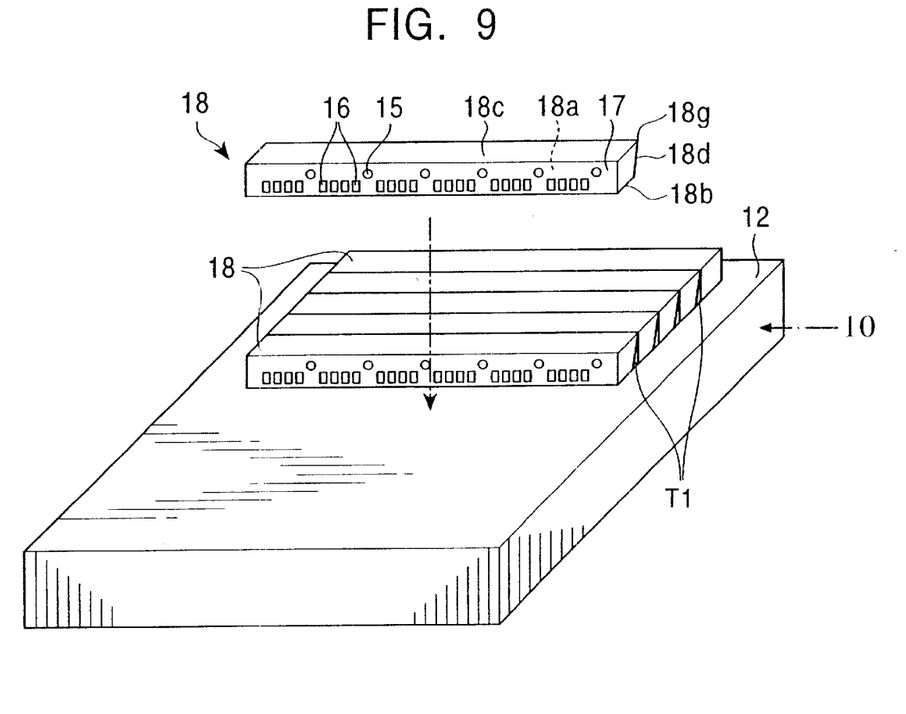
FIG. 9 is an explanatory view illustrating the production method.
Figure 10:
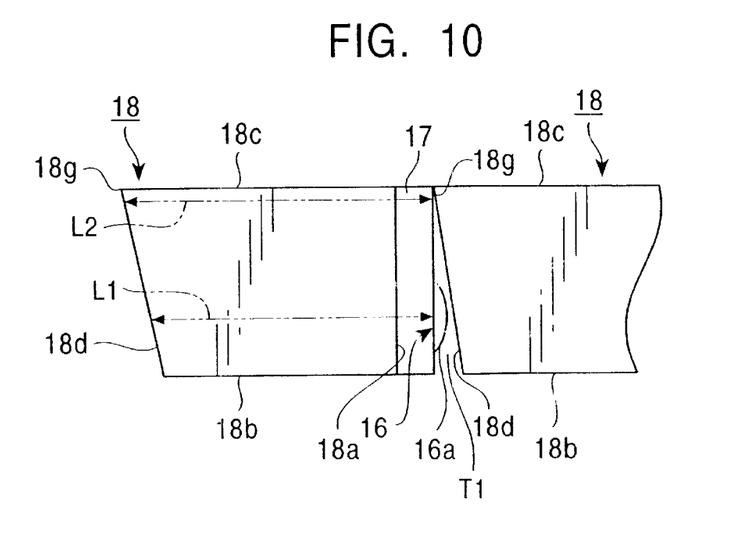
FIG. 10 is a side view of slider bars shown in FIG. 9, as viewed from the direction of arrow 10.

As shown in FIGS. 9 and 10, a plurality of slider bars 18 are arranged on a jig 12 so that bottom surfaces 18b are fixedly bonded to the jig 12 and so that one side faces 18a are oriented in the same direction, in a manner similar to that of the arranging process of the first embodiment. In this case, as shown in FIG. 10, the other side face 18d of each slider bar 18 is in contact with the protective film 17 covering the one side face 18a of the adjoining slider bar 18 on the side of the upper surface 18c, and a space T1 is formed between the exposed portion 16a of the bump 16 formed on the one side face 18a of the adjoining slider bar 18 and the other side face 18d. Accordingly, the other side face 18d of the slider bar 18 will not contact the bump 16 of the adjoining slider bar 18.

In the next film deposition process, a silicon film and a carbon film are deposited and stacked on the upper surface 18c of the slider bar 18 serving as the upper surface 14c of the slider substrate 14 by ECR-CVD.

Even when the slider bar 18 is electrically charged due to irradiation with ions or electrons during the film deposition process, since it is insulated from the exposed portion 16a of the bump 16 of the adjoining slider bar 18 by the space T1, charges of the slider bar 18 will not move into the bump 16 of the adjoining slider bar 18.

Subsequently, a magnetic disk opposing surface of the slider S2 is formed on the upper surface 18c of the slider bar 18 by a photolithographic dry etching process, in a manner similar to that of the first embodiment.

Even when the slider bar 18 is electrically charged due to irradiation with ions or electrons during the dry etching process, since it is insulated from the exposed portion 16a of the bump 16 of the adjoining slider bar 18 by the space T1, charges of the slider bar 18 will not move into the bump 16 of the adjoining slider bar 18.

Since the space T1 is closed by the other side face 18d of the slider bar 18 and the one side face 18a of the adjoining slider bar 18 on the side of the upper surface 18c, chips from the upper surface 18c will not adhere to the side faces 18a ad 18d of the slider bars 18.

The slider bar 18 is divided, in a manner similar to that of the first embodiment, and the production of the slider S2 is completed.

Figure 11:
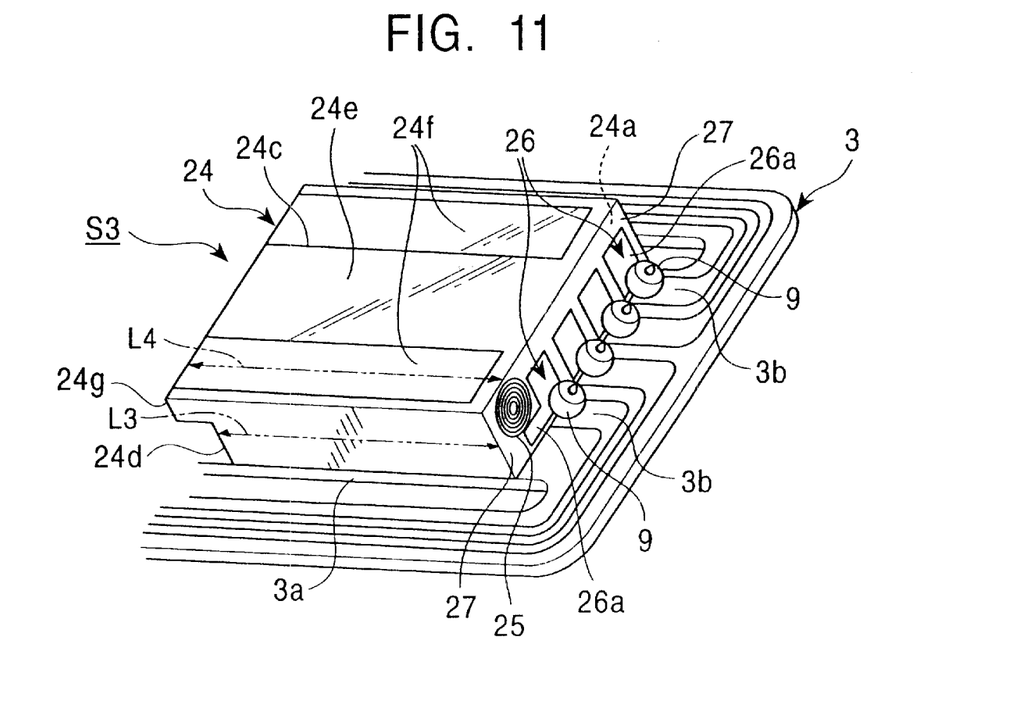
FIG. 11 is an enlarged perspective view showing the principal part of a magnetic head according to a third embodiment of the present invention.

A magnetic head and a production method therefor according to a third embodiment of the present invention will now be described with reference to FIGS. 11 to 14. Referring to FIG. 11, a slider S3 of a magnetic head according to the third embodiment is mounted on a flexure 3 in a manner similar to that of the slider S1 of the first embodiment. The slider S3 comprises a nearly rectangular slider substrate 24 made of a ceramic material, such as $Al_2O_3$—TiC, a head element 25 formed on one end face 24a of the slider substrate 24, four (two for recording and the others for playback) bumps 26 made of a good conductive material, such as Ni, so as to be electrically connected to the head element 25, and a protective film 27 made of an insulating material, such as alumina, so as to cover the head element 25. Exposed portions 26a of the bumps 26 exposed from the protective film 27 are flush with or protrude from the surface of the protective film 27.

On an upper surface 24c of the slider substrate 24 orthogonal to the one end face 24a so as to form a magnetic disk opposing surface of the slider S3, a silicon film (5 Å) and a carbon film (45 Å) are stacked in order, and an air groove 24e and rail portions 24f on both sides thereof are formed so as to obtain an air flow that allows the slider S3 to fly above a magnetic disk when a magnetic disk device is driven.

On the other end face 24d of the slider substrate 24 on the opposite side from the one end face 24a, a projecting portion 24g is formed at a position outside portions opposite from the exposed portions 26a of the bumps 26. A distance L3 from the exposed portion 26a to a position on the other end face 24d corresponding to the exposed portion 26a is shorter than a distance L4 from a position on the surface of the protective film 27 corresponding to the projecting portion 24g to the projecting portion 24g.

The projecting portion 24g is formed of a rib on the other end face 24d of the slider substrate 24 so as to be flush with the upper surface 24c.

Such a magnetic head according to the third embodiment is mounted on a hard magnetic disk device, in a manner similar to that of the first embodiment.

Figure 12:
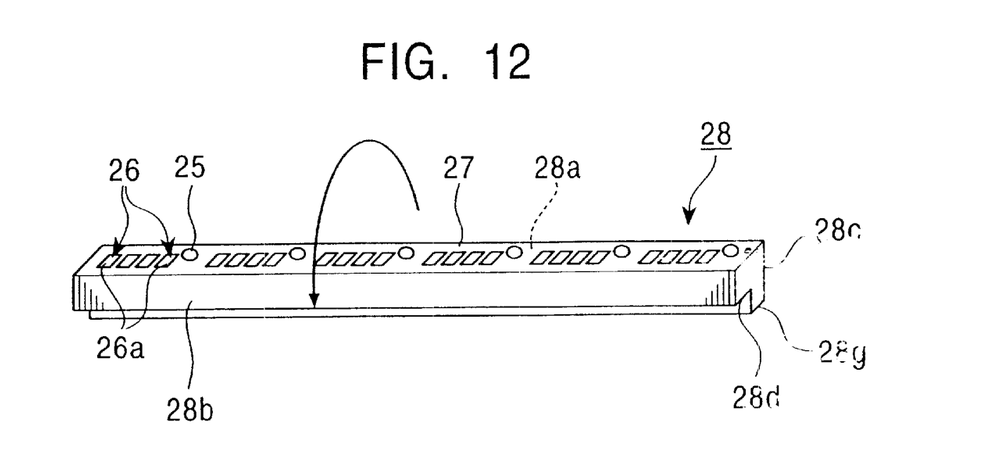
FIG. 12 is an explanatory view illustrating a production method for the magnetic head.

A production method for the slider S3 of the magnetic head according to the third embodiment will now be described with reference to FIGS. 12 to 14. First, a slider bar 28 having a plurality of head elements 25 and bumps 26 arranged in parallel is cut, as shown in FIG. 12, in a manner similar to that of the slider bar forming process of the second embodiment. In this case, one side face 28a, an upper surface 28c, the other side face 28d, and a bottom surface 28b of the slider bar 28 serve, respectively, as one end face 24a, the upper surface 24c, the other end face 24d, and the bottom surface 24b of the slider substrate 24.

In a grinding process, the other side face 28d of the slider bar 28 is ground by machining with a grinder or the like so that it becomes a rib-shaped projecting portion 28g.

Figure 13:
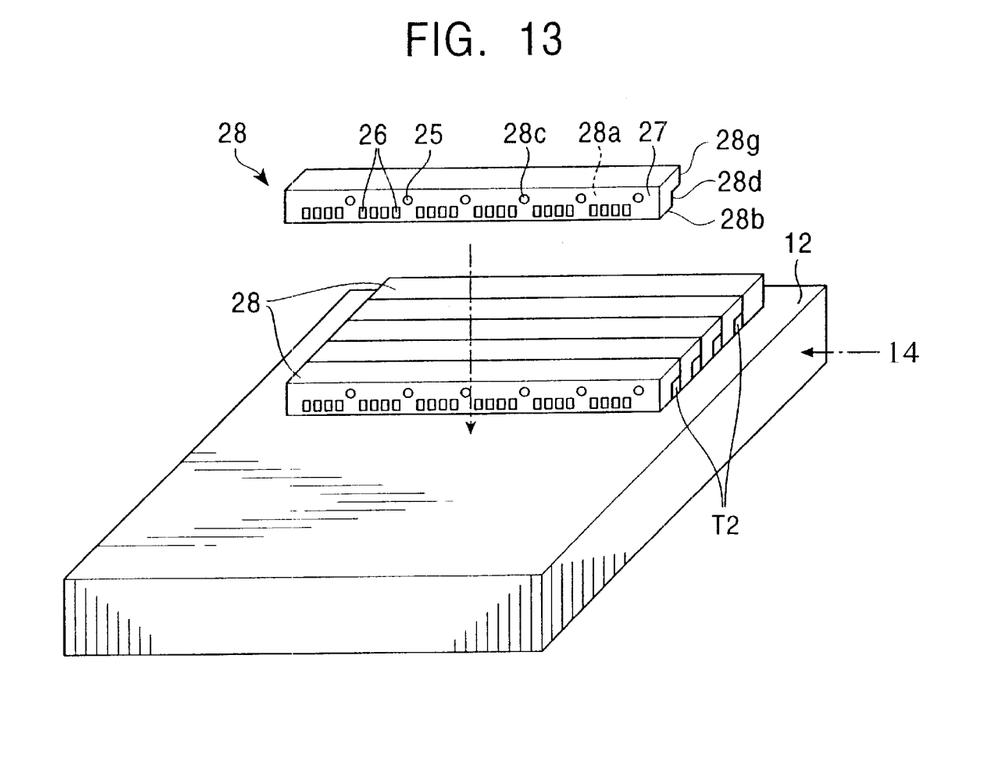
FIG. 13 is an explanatory view illustrating the production method.
Figure 14:
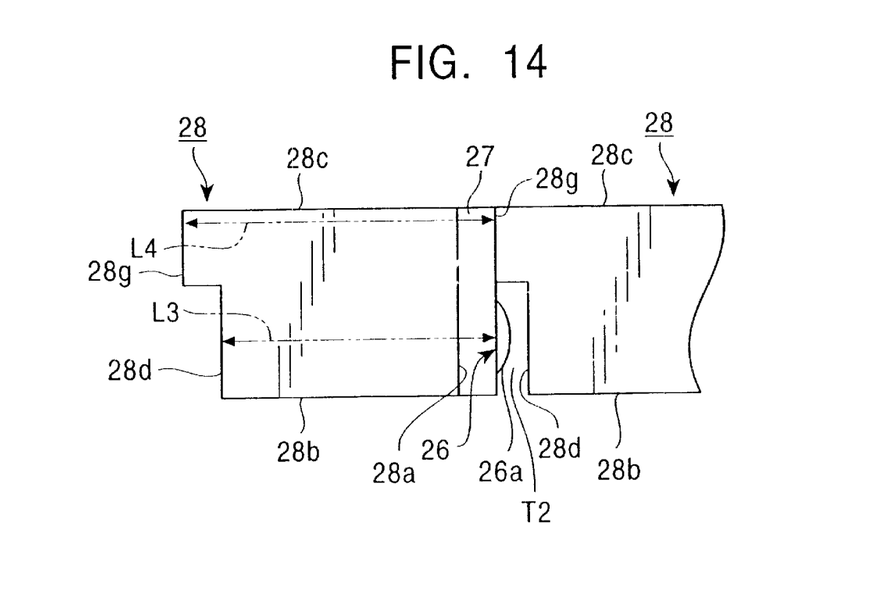
FIG. 14 is a side view of slider bars shown in FIG. 13, as viewed from the direction of arrow 14.

Subsequently, as shown in FIGS. 13 and 14, a plurality of slider bars 28 are arranged on a jig 12 so that bottom surfaces 28b thereof are fixedly bonded to the jig 12 and so that one end faces 28a are oriented in the same direction, in a manner similar to that in the arranging process of the first embodiment. In this case, as shown in FIG. 14, the projecting portion 28g of the other side face 28d of each slider bar 28 is in contact with the protective film 27 covering one end face 28a of the adjoining slider bar 28, on the side of the upper surface 28c, and a space T2 is formed between the exposed portion 26a of the bump 26 formed in the adjoining slider bar 28 and the other side face 28d. Accordingly, the other side face 28d of the slider bar 28 will not contact the bump 26 of the adjoining slider bar 28.

In the next film deposition process, a silicon film and a carbon film are deposited and stacked on the upper surface 28c of the slider bar 28 serving as the upper surface 24c of the slider substrate 24 by ECR-CVD.

Even when the slider bar 28 is electrically charged due to irradiation with ions or electrons during the film deposition process, since it is insulated from the exposed portion 26a of the bump 26 formed in the adjoining slider bar 28 by the space T2, charges of the slider bar 28 will not move into the bump 26 of the adjoining slider bar 28.

The upper surface 28c of the slider bar 28 is subjected to a photolithographic dry etching process, in a manner similar to that of the first embodiment, thereby forming a magnetic disk opposing surface of the slider S3.

Even when the slider bar 28 is electrically charged due to irradiation with ions or electrons during the dry etching process, since it is insulated from the exposed portion 26a of the bump 26 in the adjoining slider bar 28 by the space T2, charges of the slider bar 28 will not move into the bump 26 of the adjoining slider bar 28.

Since the space T2 is closed by the other side face 28d of the slider bar 28 and the one side face 28a of the adjoining slider bar 28 on the side of the upper surface 28c, chips from the upper surface 28c will not adhere to the side faces 28a and 28d.

The slider bar 2 is divided, in a manner similar to that of the first embodiment, and the production of the slider S3 is completed.

Figure 15:
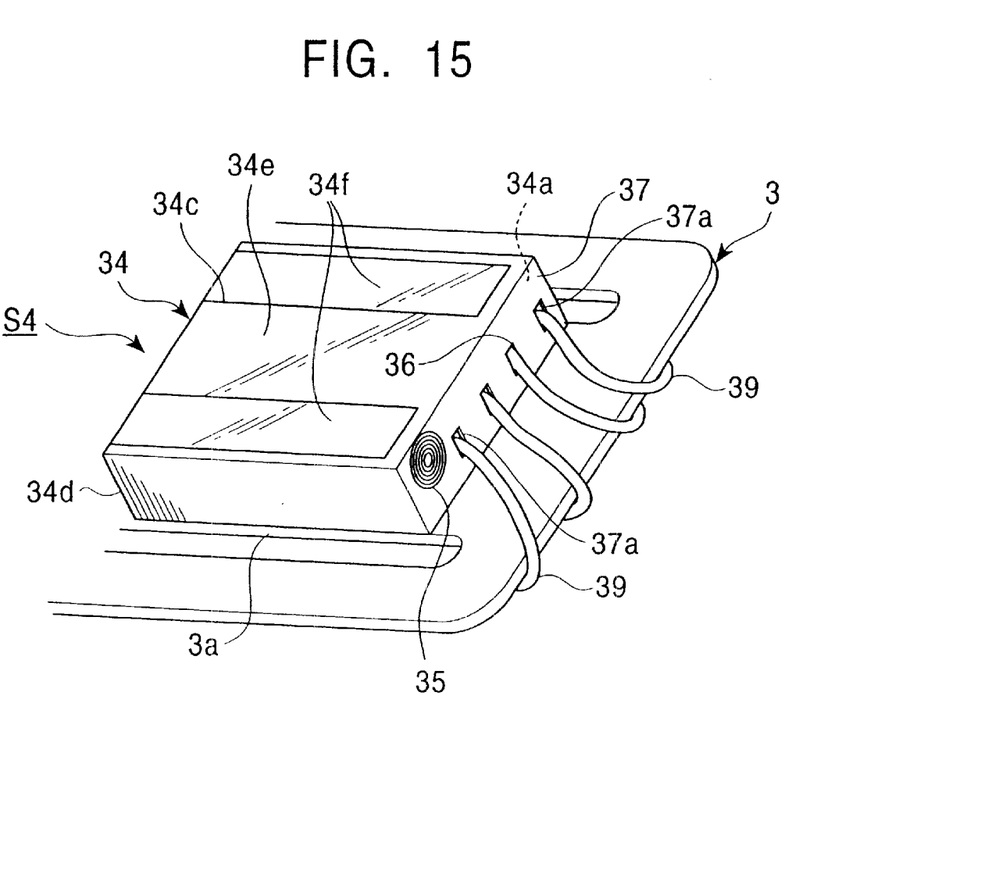
FIG. 15 is an enlarged perspective view showing the principal part of a magnetic head according to a fourth embodiment of the present invention.

A magnetic head and a production method therefor according to a fourth embodiment of the present invention will now be described with reference to FIGS. 15 to 18. Referring to FIG. 15, a slider S4 of a magnetic head according to the fourth embodiment is mounted on a flexure 3 in a manner similar to that of the slider S1 of the first embodiment. The slider S4 comprises a nearly rectangular slider substrate 34 made of a ceramic material, such as $Al_2O_3$—TiC, a head element 35 formed on one end face 34a of the slider substrate 34, four (two for recording and the others for playback) bumps 36 made of a good conductive material, such as Ni, so as to be electrically connected to the head element 35, and a protective film 37 made of an insulating material, such as alumina, so as to cover the head element 35.

The protective film 37 has window portions 37a corresponding to the respective bumps 36. Exposed portions 36a of the bumps 36 are exposed from the window portions 37a and are recessed from the surface of the protective film 37.

Leading ends of wires 39 electrically connected to the outside are joined to the exposed portions 36a of the bumps 36 exposed from the protective film 37, so that the bumps 36 and the wires 39 are electrically connected.

On the other hand, the other end face 34d of the slider substrate 34 is a flat surface in parallel with the one end face 34a.

On an upper surface 34c of the slider substrate 34 orthogonal to the one end face 34a so as to form a magnetic disk opposing surface of the slider S4, a silicon film (5 Å) and a carbon film (45 Å) are stacked in order, and an air groove 34e and rail portions 34f on both sides thereof are formed so as to obtain an air flow that allows the slider S4 to fly above a magnetic disk when a magnetic disk device is driven.

Such a magnetic head of the fourth embodiment is mounted in a hard magnetic disk device, in a manner similar to that of the first embodiment.

A production method for the slider S4 of the magnetic head according to the fourth embodiment will be described with reference to FIGS. 16 to 18. First, a plurality of head elements 35 and bumps 36 connected to the respective head elements 35 are formed on the surface of a wafer 10 made of a ceramic material, such as $Al_2O_3$—TiC, in a manner similar to that of the head forming process of the first embodiment shown in FIG. 3. A protective film 37 is then formed to cover the head elements 35 and the bumps 36, and window portions 37a are formed in the protective film 37 by a photolithographic etching process so that exposed portions 36a of the bumps 36 are exposed from the protective film 37. The exposed portions 36a are thereby recessed from the surface of the protective film 37.

Figure 16:
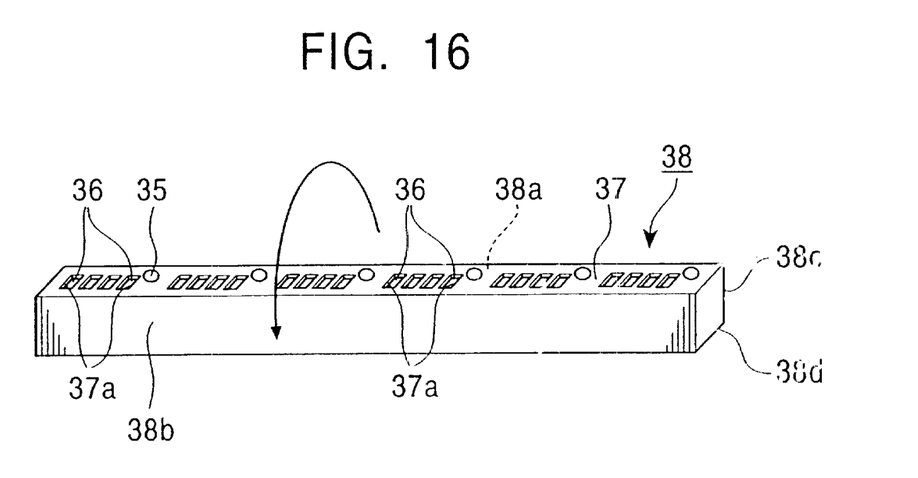
FIG. 16 is an explanatory view illustrating a production method for the magnetic head.

Subsequently, a slider bar 38, in which a plurality of head elements 35 and bumps 36 are arranged in parallel, as shown in FIG. 16, is cut in a manner similar to that of the slider bar forming process of the first embodiment. In this case, one side face 38a, an upper surface 38c, the other side face 38d, and a bottom surface 38b of the slider bar 38 serve, respectively, as one end face 34a, the upper surface 34c, the other end face 34d, and the bottom surface 34b of the slider substrate 34.

Figure 17:
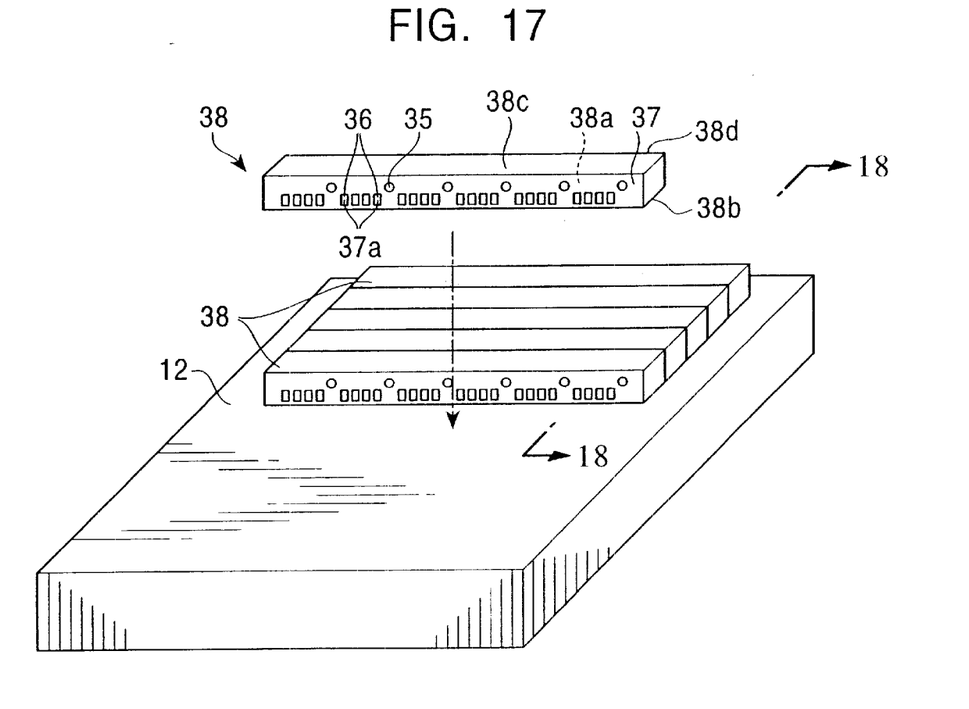
FIG. 17 is an explanatory view illustrating the production method.
Figure 18:
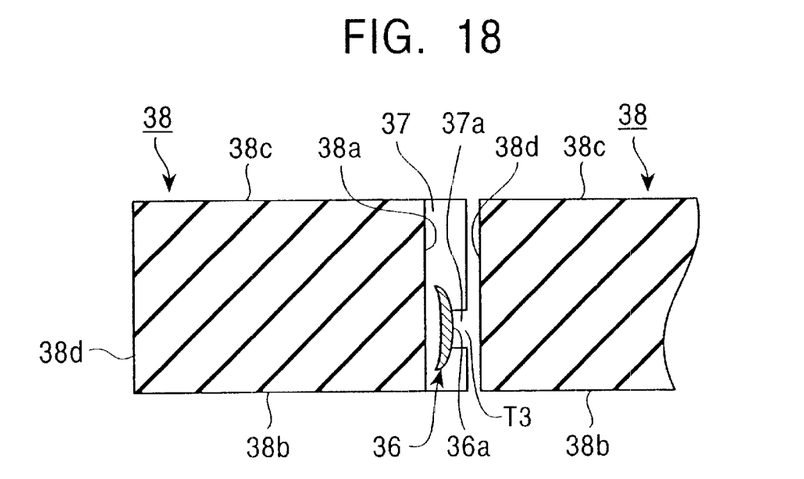
FIG. 18 is a cross-sectional view of slider bars, taken along line 18—18 in FIG. 17.

Subsequently, a plurality of slider bars 38 are arranged on a jig 12 so that bottom surfaces 38b thereof are fixedly bonded to the jig 12 and so that side faces 38a are oriented in the same direction, in a manner similar to that of the arranging process of the first embodiment, as shown in FIGS. 17 and 18. In this case, as shown in FIG. 18, the other side face 38d of each slider bar 38 is in contact with the protective film 37 covering one side face 38a of the adjoining slider bar 38, and a space T3 is formed between the other side face 38d and the exposed portion 36a of the bump 36 formed in the adjoining slider bar 38. Therefore, the other side face 38d of the slider bar 38 will not contact the bump 36 of the adjoining slider bar 38.

In the next film deposition process, a silicon film and a carbon film are deposited and stacked on the upper surface 38c of the slider bar 38 by ECR-CVD.

Even when the slider bar 38 is electrically charged due to irradiation with ions or electrons during the film deposition process, since it is insulated from the exposed portion 36a of the bump 36 in the adjoining slider bar 38 by the space T3, charges of the slider bar 38 will not move into the bump 36 of the adjoining slider bar 38.

A magnetic disk opposing surface of the slider S4 is formed on the upper surface 38c of the slider bar 38 by a photolithographic dry etching process, in a manner similar to that of the first embodiment.

Even when the slider bar 38 is electrically charged due to irradiation with ions or electrons during the dry etching process, since it is insulated from the exposed portion 36a of the bump 36 in the adjoining slider bar 38 by the space T3, charges of the slider bar 38 will not move into the bump 36 of the adjoining slider bar 38.

The slider bar 38 is divided, in a manner similar to that of the first embodiment, and the production of the slider S4 is then completed.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so a to encompass all such modifications and equivalent structures and functions.

What is claimed is:

1. A magnetic head having a slider,
   wherein said slider comprises:
   a slider substrate;
   at least one head element formed on one end face of said slider substrate;
   a protective film for covering said head element; and
   a plural bump electrically connected to said head element and having an exposed portion exposed from said protective film, and
   wherein the other end face of said slider substrate on the opposite side from said one end face with said head element has a projecting portion, the distance from the surface of said protective film to said projecting portion formed on said other end face is longer than the distance from said exposed portion of said bump to said other end face, said projecting portion is formed of a rib projecting from said other end face, said slider has a magnetic disk opposing surface opposing a magnetic disk, and said rib is flush with said magnetic disk opposing surface.

2. A magnetic head according to claim 1, wherein said exposed portion of said bump is flush with or protrudes from the surface of said protective film.

* * * * *